United States Patent
Kikkawa

(10) Patent No.: US 11,358,312 B2
(45) Date of Patent: *Jun. 14, 2022

(54) METHOD FOR MANUFACTURING INTERDENTAL CLEANER

(71) Applicant: KOBAYASHI PHARMACEUTICAL CO., LTD., Osaka (JP)

(72) Inventor: Tasuku Kikkawa, Osaka (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 383 days.

This patent is subject to a terminal disclaimer.

(21) Appl. No.: 16/472,873

(22) PCT Filed: Dec. 28, 2017

(86) PCT No.: PCT/JP2017/047351
§ 371 (c)(1),
(2) Date: Jun. 22, 2019

(87) PCT Pub. No.: WO2018/124298
PCT Pub. Date: Jul. 5, 2018

(65) Prior Publication Data
US 2020/0188071 A1    Jun. 18, 2020

(30) Foreign Application Priority Data

Dec. 28, 2016   (JP) .............................. JP2016-256516

(51) Int. Cl.
*B29C 45/16* (2006.01)
*A61C 15/02* (2006.01)
(Continued)

(52) U.S. Cl.
CPC ................ *B29C 45/16* (2013.01); *A46B 3/04* (2013.01); *A46B 5/02* (2013.01); *A46B 9/04* (2013.01);
(Continued)

(58) Field of Classification Search
CPC .......................... A64B 2200/108; A61C 15/02
See application file for complete search history.

(56) References Cited

U.S. PATENT DOCUMENTS

| 6,516,809 B1 * | 2/2003 | Schumacher | ........ A24C 5/1892 131/309 |
| 7,083,756 B2 * | 8/2006 | Strahler | ................... A46B 5/02 264/328.8 |

(Continued)

FOREIGN PATENT DOCUMENTS

| CN | 1822800 A | 8/2006 |
| CN | 101138524 A | 3/2008 |

(Continued)

OTHER PUBLICATIONS

Hamouda, Ibrahim M., and Mohammed M. Beyari. "Addition of glass fibers and titanium dioxide nanoparticles to the acrylic resin denture base material: comparative study with the conventional and high impact types." Oral Health Dent Manag 13.1 (Mar. 2014): 107-112. (Year: 2014).*

(Continued)

*Primary Examiner* — Benjamin A Schiffman
(74) *Attorney, Agent, or Firm* — Kratz, Quintos & Hanson, LLP

(57) ABSTRACT

To provide method for manufacturing interdental cleaner configured to suppress leakage of elastomer from space for forming slip resistance portion in mold to outside of space in step of filling elastomer into mold. Method for manufacturing interdental cleaner includes first step of molding base portion having handle portion and shaft portion (40) by filling composite material into first mold, and second step of forming cleaning portion and slip resistance portion by filling elastomer into second mold (200) with the base portion situated in second mold (200). In first step, what is molded has handle portion including base (24), recessed (Continued)

portion (26), and bulge portion (28) bulging from surface of the recessed portion (26). In second step, cleaning portion and slip resistance portion are formed by filling elastomer into second space from portion of base portion distant from bulge portion (28) toward shaft portion (40).

12 Claims, 10 Drawing Sheets

(51) Int. Cl.
*A46D 3/00* (2006.01)
*A46B 9/04* (2006.01)
*A46B 3/04* (2006.01)
*B29C 45/00* (2006.01)
*A46B 5/02* (2006.01)
*A46B 15/00* (2006.01)
*B29C 45/26* (2006.01)
*B29L 31/42* (2006.01)
*B29K 21/00* (2006.01)
*B29K 309/08* (2006.01)
*B29K 509/02* (2006.01)

(52) U.S. Cl.
CPC .............. *A46D 3/00* (2013.01); *A61C 15/02* (2013.01); *B29C 45/0005* (2013.01); *A46B 15/0069* (2013.01); *A46B 15/0093* (2013.01); *A46B 2200/108* (2013.01); *B29C 45/1676* (2013.01); *B29C 45/2626* (2013.01); *B29C 2045/1692* (2013.01); *B29K 2021/00* (2013.01); *B29K 2309/08* (2013.01); *B29K 2509/02* (2013.01); *B29L 2031/425* (2013.01)

(56) References Cited

U.S. PATENT DOCUMENTS

| | | | | |
|---|---|---|---|---|
| 7,503,093 | B2* | 3/2009 | Weihrauch | B29C 45/0055 |
| | | | | 15/187 |
| 9,283,719 | B2* | 3/2016 | Kikuchi | B29C 45/1679 |
| 9,642,682 | B2* | 5/2017 | Kato | B29C 45/14065 |
| 10,195,005 | B2* | 2/2019 | Wallstrom | A46B 9/005 |
| 10,500,774 | B2* | 12/2019 | Gengyo | A46B 15/0093 |
| 10,779,919 | B2* | 9/2020 | Kato | A46B 9/04 |
| 10,918,466 | B2* | 2/2021 | Kikkawa | A46B 15/0093 |
| 2004/0055619 | A1 | 3/2004 | Ko | |
| 2013/0273502 | A1* | 10/2013 | Shaw | A61C 15/02 |
| | | | | 433/216 |
| 2014/0335474 | A1* | 11/2014 | Shaw | A61C 15/02 |
| | | | | 433/216 |
| 2015/0114428 | A1 | 4/2015 | Kato | |
| 2017/0189148 | A1 | 7/2017 | Kato | |
| 2017/0319310 | A1 | 11/2017 | Gengyo | |
| 2018/0168783 | A1 | 6/2018 | Kato | |
| 2019/0060037 | A1 | 2/2019 | Kato | |
| 2019/0133729 | A1 | 5/2019 | Kato | |
| 2020/0188071 | A1* | 6/2020 | Kikkawa | A61C 15/02 |

FOREIGN PATENT DOCUMENTS

| | | | | | |
|---|---|---|---|---|---|
| EP | | 2829253 | A1 | 1/2015 | |
| FR | | 2519543 | A1 | 7/1983 | |
| JP | | 2003508099 | A | 3/2003 | |
| JP | | 1253392 | S | 10/2005 | |
| JP | | 2016-104382 | A1 | 6/2016 | |
| JP | | 2016215648 | A | 12/2016 | |
| WO | | 01/15567 | A1 | 3/2001 | |
| WO | | 2016/076373 | A1 | 5/2016 | |
| WO | | 2016/199835 | A1 | 12/2016 | |
| WO | | WO-2017086369 | A1 * | 5/2017 | .............. A46B 5/00 |
| WO | | WO-2017086370 | A1 * | 5/2017 | ............. A61C 15/02 |

OTHER PUBLICATIONS

Office Action of Japanese Patent Application No. 2016-256516: Notice of Opposition dated Mar. 27, 2019 (33 pages, 2 pages translation, 35 pages total).

International Search Report of the International Searching Authority for International Application No. PCT/JP2017/047351 dated Mar. 13, 2018 (2 pages, 1 page translation).

Written Opinion of the International Searching Authority for International Application No. PCT/JP2017/047351 dated Mar. 13, 2018 (3 pages).

* cited by examiner

METHOD FOR MANUFACTURING INTERDENTAL CLEANER

BACKGROUND OF THE INVENTION

(1) Field of the Invention

The present invention relates to a method for manufacturing an interdental cleaner.

(2) Description of Related Art

Conventionally, there is a known interdental cleaner especially suitable for cleaning an interdental space between back teeth. Patent Literature 1 discloses, for example, an interdental cleaner including a base material portion made of synthetic resin and a soft portion made of elastomer. The base material portion has a handle base and a thin shaft-shaped core portion. The handle base has a curved shape. An annular recessed portion is formed in the handle base. The soft portion has a cleaning soft portion formed around the core portion and a slip resistance portion formed around the annular recessed portion.

The interdental cleaners are manufactured by performing a first step of molding the base material portions (primary molded products) and a second step of molding the interdental cleaners (secondary molded products) by forming the soft portions on the respective base material portions. In detail, in the first step, the base material portions (primary molded products) are molded by filling the synthetic resin into a first mold having spaces in correspondence to the base material portions. In the subsequent second step, the elastomer is filled into second mold having spaces for forming the soft portions around the respective base material portions under a condition in which the base material portions are situated in the second mold. In detail, the elastomer is filled into the second mold from gates formed at positions in correspondence to portions of the respective base material portions between the respective core portions and the respective annular recessed portions. In the second step, the cleaning soft portions configured to clean interdental spaces are formed by filling the elastomer around the respective core portions, and the slip resistance portions are formed by filling the elastomer into the respective annular recessed portions in the respective handle bases. Through the aforementioned steps, the interdental cleaners (secondary molded products) respectively including the base material portions and the soft portions are molded.

CITATION LIST

Patent Literature

Patent Literature 1: JP 2016-104382 A

BRIEF SUMMARY OF THE INVENTION

Problem to be Solved by the Invention

With regard to the method for manufacturing the interdental cleaner described in Patent Literature 1, the elastomer may leak from the spaces in the second mold for forming the slip resistance portions to the outside of the spaces in the second step in some cases. More specifically, in the second step, the elastomer injected into the second mold from the gates formed in the second mold may leak outside the respective spaces through clearances between the second mold and the respective handle bases after colliding with side surfaces of the respective annular recessed portions of the respective handle bases in some cases. In this case, what is molded as the second molded products has unnecessary film portions formed of the elastomer at portions of the handle bases other than peripheries of the annular recessed portions.

An object of the present invention is to provide a method for manufacturing an interdental cleaner configured to suppress leakage of elastomer from a space for forming a slip resistance portion in a mold to the outside of the space in a step of filling the elastomer into the mold.

Solution to Problem

To solve the aforementioned problem, according to the present invention, there is provided a method for manufacturing an interdental cleaner including: a first step of molding a base portion by filling composite material including synthetic resin into a first mold having a first space in correspondence to the base portion including a handle portion, which has a shape that is at least partially curved, and a shaft portion connected to a distal end portion of the handle portion, the shaft portion having a sectional area smaller than a sectional area of the handle portion, and a shape which allows the shaft portion to be inserted into an interdental space; and a second step of forming a cleaning portion, which is configured to clean the interdental space, and a slip resistance portion by filling elastomer into a second mold under a condition in which the base portion is situated in the second mold, the second mold including a second space configured to form the cleaning portion around the shaft portion and form the slip resistance portion on a surface of the handle portion. In the first step, what is molded as the handle portion includes a base, a recessed portion having a shape recessed from a surface of the base, and a bulge portion bulging from a portion of a surface of the recessed portion, which is distant from a boundary between the base and the recessed portion. In the second step, the cleaning portion is formed around the shaft portion, and the slip resistance portion is formed on the surface of the recessed portion by filling the elastomer into the second space from a portion of the base portion which is closer to the shaft portion than the bulge portion so that the elastomer flows along the shaft portion and the recessed portion.

With regard to this manufacturing method, the base portion having the bulge portion bulging from the surface of the recessed portion of the handle portion is molded in the first step. In the second step, the elastomer is filled into the second space from the portion of the base portion which is closer to the shaft portion than the bulge portion. Therefore, the elastomer flowing along the recessed portion in the second step collides with a side surface of the bulge portion before colliding with the boundary between the recessed portion and the base (a side surface rising from the recessed portion). As a result, a flow velocity of the elastomer reduces. Therefore, the elastomer is prevented from strongly colliding with the boundary between the recessed portion and the base. Consequently, it is suppressed for the elastomer to leak from the second space in the second mold to the outside of the second space in the second step.

In this case, in the second step, the elastomer may be filled into the second space from a position in correspondence to a distal end portion of the shaft portion.

In this way, it is suppressed for the elastomer to be filled insufficiently especially at the distal end portion of the shaft portion (incomplete molding of the cleaning portion).

Alternatively, in the second step, the elastomer may be filled into the second space from a portion of the recessed portion which is closer to the shaft portion than the bulge portion.

In this way, the elastomer flowing along the recessed portion is likely to collide with the side surface of the bulge portion. As a result, so-called jetting (an external visual defect of an elastomer flow mark) is less likely to happen to a vicinity of the bulge portion.

With regard to the method for manufacturing the interdental cleaner, preferably, in the first step, what is molded as the handle portion has a back-side edge portion formed on one side in a direction orthogonal to an axial direction of the shaft portion to have a curved shape, a belly-side edge portion formed on another side to have a curved shape, the base formed at a position including at least a part of the belly-side edge portion, the recessed portion formed at a position including at least a part of the back-side edge portion, and an angle between a tangent to a distal end portion of the back-side edge portion and the axial direction of the shaft portion, the angle being smaller than an angle between a tangent to a distal end portion of the belly-side edge portion and the axial direction of the shaft portion.

In this way, the elastomer smoothly flows from a periphery of the shaft portion toward the recessed portion. Since the handle portion is slightly displaced toward a belly side of the handle portion in the second mold by an injection pressure of the elastomer, a flow path from the periphery of the shaft portion to the recessed portion is secured.

With regard to the method for manufacturing the interdental cleaner, preferably, in the first step, what is molded has the recessed portion including a flow path widening region in which a flow path area for the elastomer at a portion distant by 1 mm from a specific portion of the recessed portion to an opposite side from the shaft portion is larger by no less than 7% in comparison with a flow path area for the elastomer at the specific portion, and the bulge portion which is at least partially situated in the flow path widening region.

In this way, the interdental cleaner is manufactured to have an effective slip resistance function while it is suppressed for the elastomer flowing along the recessed portion to cause the jetting in the flow path widening region in the second step. In detail, if the flow path area in the recessed portion for the elastomer increases abruptly when the elastomer flows along the recessed portion, the jetting may happen to a vicinity of the position of the abrupt increase in the flow path area. With regard to this manufacturing method, since at least a part of the bulge portion is situated in the flow path widening region, the jetting resultant from the increase in the flow path area is less likely to happen.

With regard to the method for manufacturing the interdental cleaner, preferably, in the first step, the composite material including the synthetic resin and glass fiber is filled into the first mold.

In this way, since the base portion reinforced with the glass fiber is molded in the first step, it is possible to suppress damage to the bulge portion even if there is a contact between the bulge portion and the second mold when the base portion is situated in the second mold. Vibration of the base portion may be suppressed when the base portion is situated in the second mold as well.

In this case, preferably, in the first step, the composite material further including titanium dioxide may be filled into the first mold.

Although the reinforcing effect of the glass fiber on the base portion is slightly reduced by inclusion of titanium dioxide, the bulge portion provided to the base portion suppresses the reduction in strength of the handle portion caused by the inclusion of titanium dioxide and the resultant vibration of the base portion when the base portion is situated in the second mold. It is also possible to mold the white base portion at low cost.

Effects of Invention

As described above, according to the present invention, it is possible to provide the method for manufacturing an interdental cleaner configured to suppress leakage of the elastomer from the space for forming the slip resistance portion in the mold to the outside of the space in the step of filling the elastomer into the mold.

DETAILED DESCRIPTION OF THE INVENTION

Figure 1:
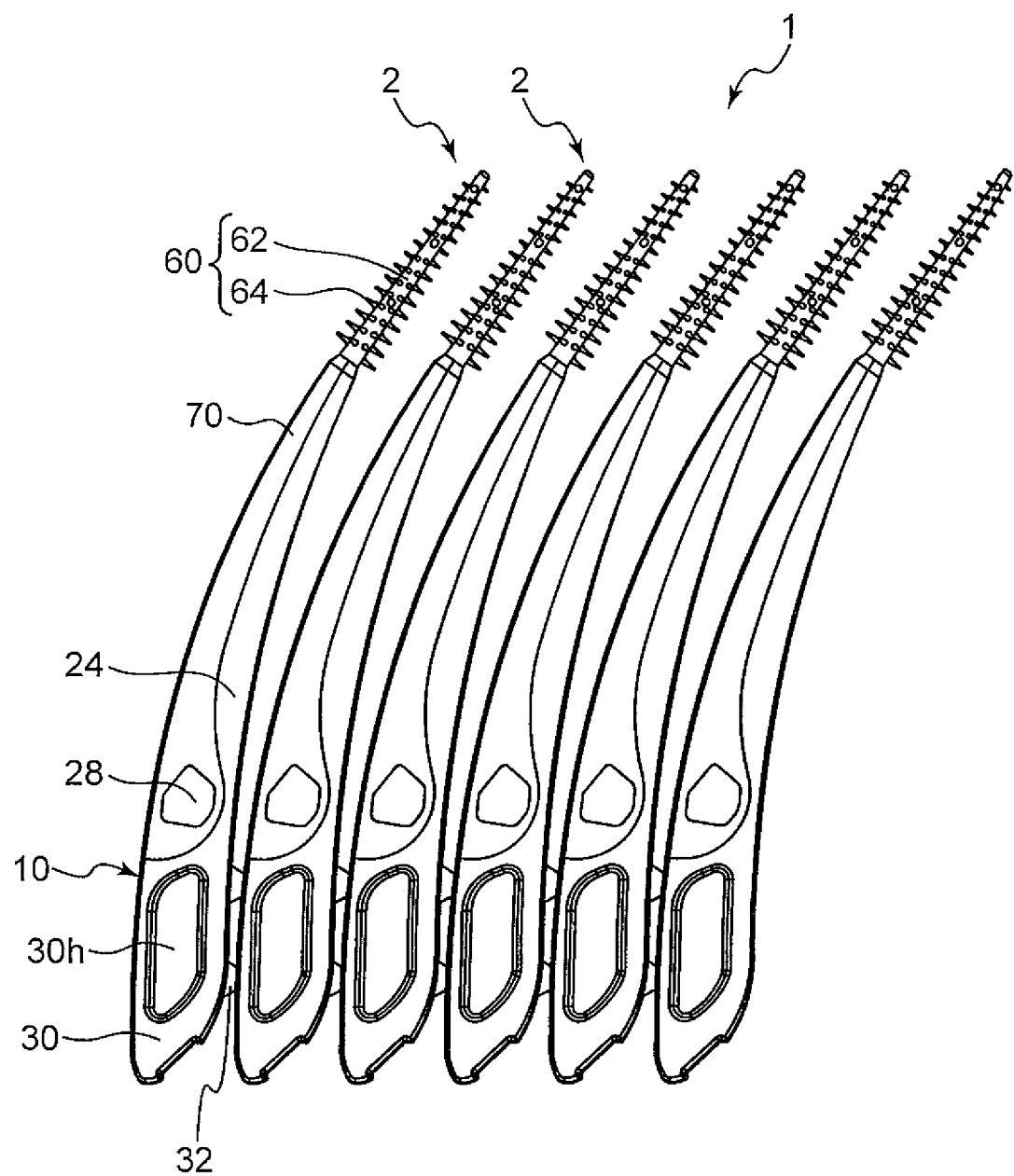
FIG. 1 is a front view of an interdental cleaner group according to an embodiment of the present invention.
Figure 2:
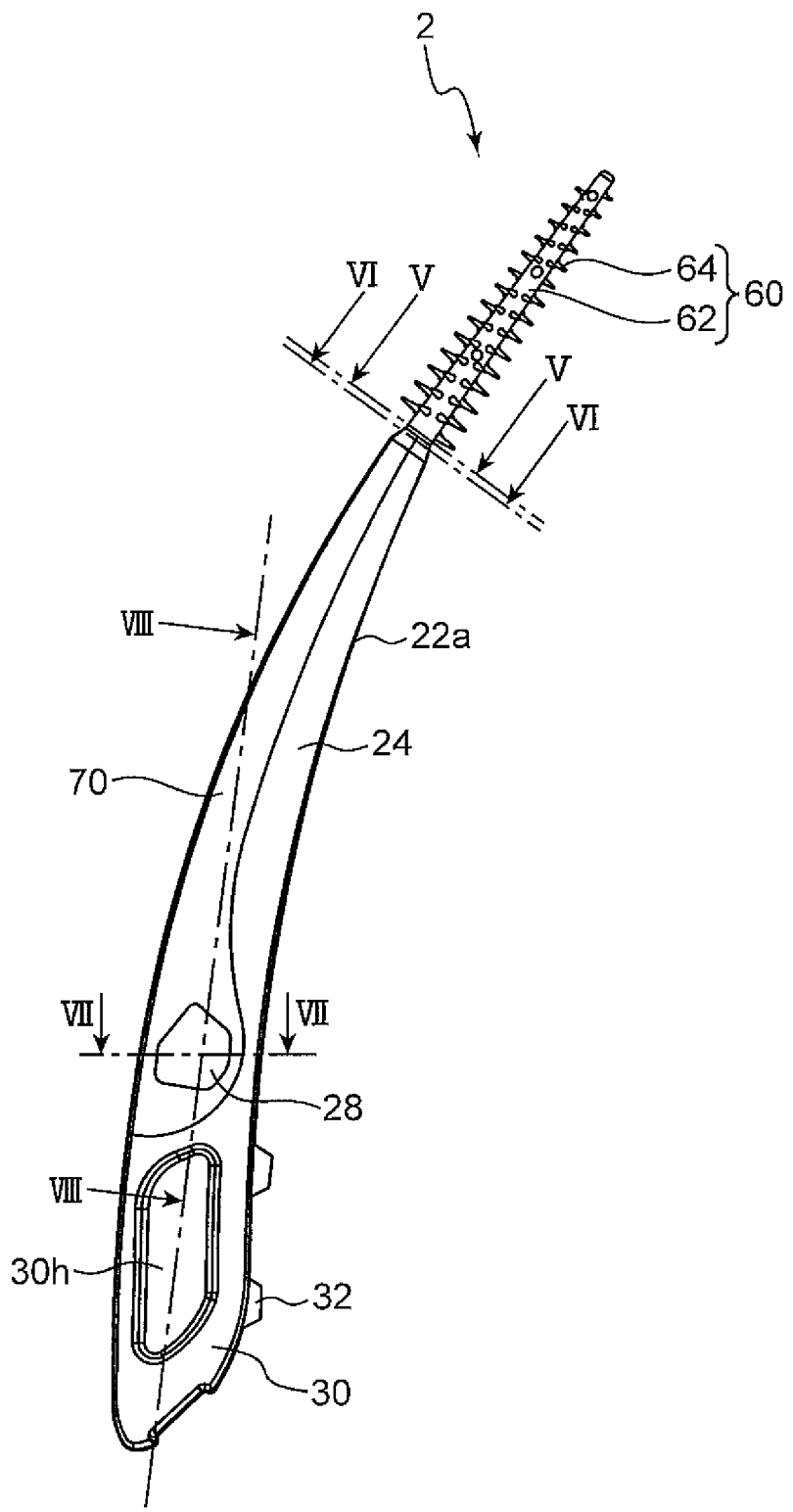
FIG. 2 is a front view of the interdental cleaner.
Figure 3:
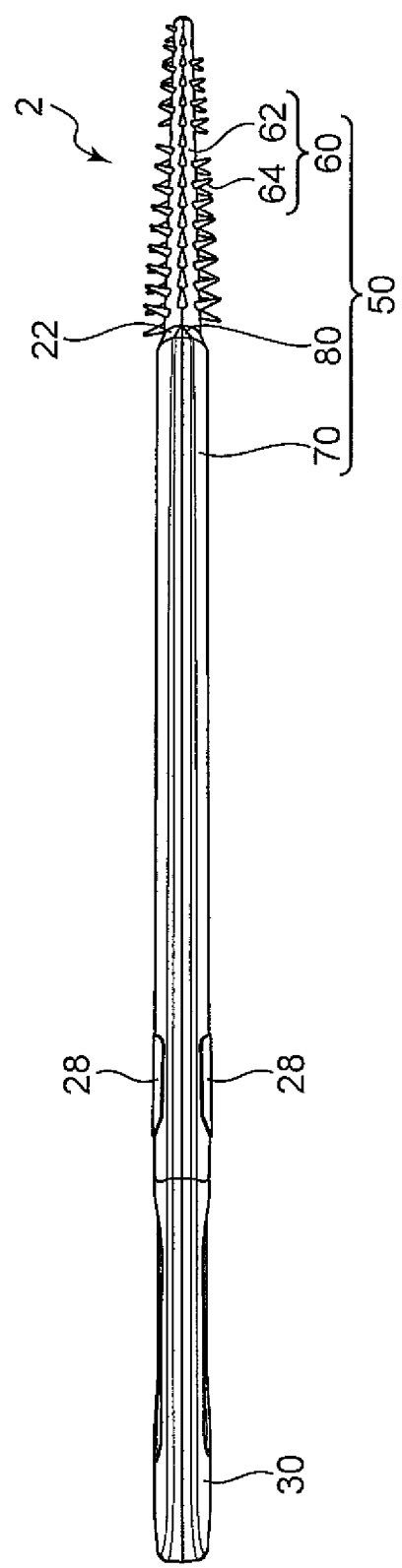
FIG. 3 is a left view of the interdental cleaner shown in FIG. 2.
Figure 4:
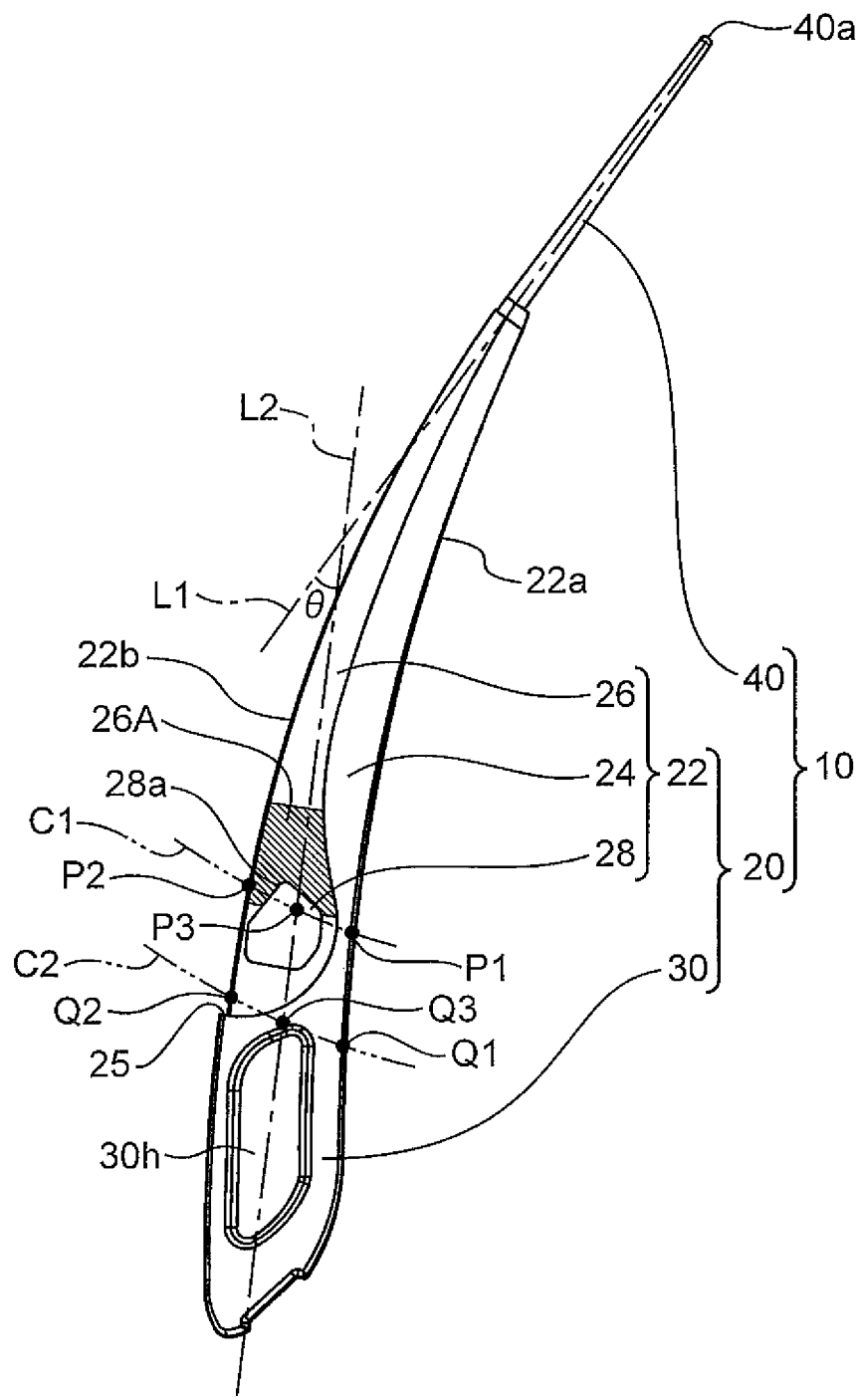
FIG. 4 is a front view of a base portion of the interdental cleaner shown in FIG. 2.

An interdental cleaner group 1 according to an embodiment of the present invention is described with reference to FIGS. 1 to 10. As shown in FIG. 1, the interdental cleaner group 1 includes interdental cleaners 2 connected to each other. The interdental cleaners 2 adjacent to each other are connected by connecting portions 32. Each of the interdental cleaners 2 has a base portion 10 (c.f. FIG. 4) made of composite material including synthetic resin and a soft portion 50 (c.f. FIG. 3) made of elastomer having hardness lower than that of the composite material. The composite material is material including the synthetic resin, glass fiber and titanium dioxide. A glass fiber content in the composite material is preferably 10 to 49% by weight and more preferably 15 to 45% by weight. A titanium dioxide content in the composite material is preferably 0.5 to 10% by weight and more preferably 1 to 5% by weight. With regard to the present embodiment, the glass fiber content is 30% by weight and the titanium dioxide content is 3% by weight. Polypropylene, ABS, polybutylene terephthalate, polycarbonate, polyethylene terephthalate, polystyrene, polyacetal or the like is preferably used as the synthetic resin. Styrene elastomer, silicon, olefin elastomer, polyester elastomer or the like is preferably used as the elastomer. With regard to the present embodiment, polypropylene is used as the synthetic resin, and styrene elastomer is used as the elastomer.

Figure 9:
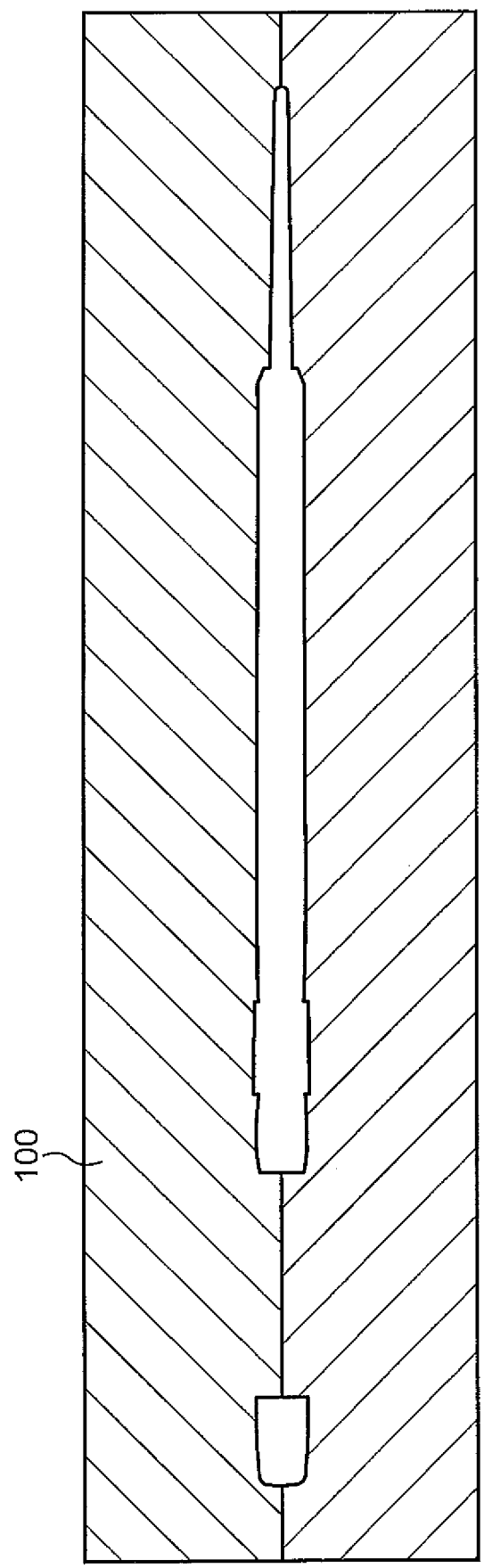
FIG. 9 is a view showing a first mold.
Figure 10:
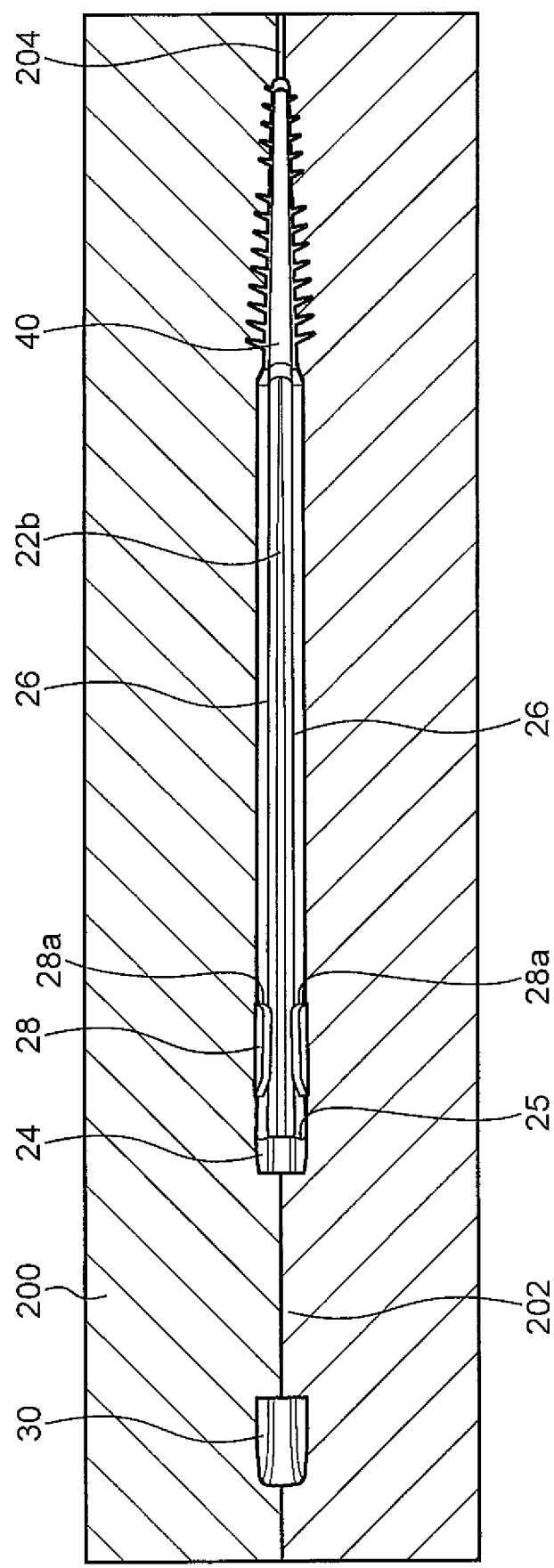
FIG. 10 is a view showing a second mold and the base portion.

The respective interdental cleaners 2 are manufactured by performing the following first and second steps. In the first step, the base portions (primary molded products) 10 are molded by filling the composite material into a first mold 100 (c.f. FIG. 9) having a first space in correspondence to the base portions 10. In the second step, the interdental cleaners (secondary molded products) 2 respectively having the soft portions 50 are manufactured by filling the elastomer into a second mold 200 (c.f. FIG. 10) having second spaces configured to form the soft portions 50 under a condition in which the base portions 10 is situated in the second mold 200. Details of the manufacturing method are described later.

As shown in FIG. 4, the base portion 10 has a handle portion 20 to be held by fingers, and a shaft portion 40 connected to a distal end portion (upper end portion in FIG. 4) of the handle portion 20.

The handle portion 20 has a shape curved at least partially. With regard to the present embodiment, the handle portion 20 is formed in a flat shape. The handle portion 20 has a handle main body 22 and a held portion 30.

With regard to the present embodiment, the handle main body 22 has a shape which is curved entirely. The handle main body 22 has a belly-side edge portion 22a and a back-side edge portion 22b. The belly-side edge portion 22a is a portion which is formed on one side (the right side in FIG. 4) of the handle main body 22 in a direction orthogonal to an axial direction of the shaft portion 40, the belly-side edge portion 22a having a curved shape. The back-side edge portion 22b is a portion which is formed on the other side (the left side in FIG. 4) of the handle main body 22 in the direction orthogonal to the axial direction of the shaft portion 40, the back-side edge portion 22b having a curved shape. A size of the handle main body 22 in a width direction (direction connecting the belly-side edge portion 22a and the back-side edge portion 22b) is larger than a thickness of the handle main body 22. The handle main body 22 has a base 24, a recessed portion 26 and bulge portions 28.

The base 24 includes the belly-side edge portion 22a and has a curved shape.

Figure 7:
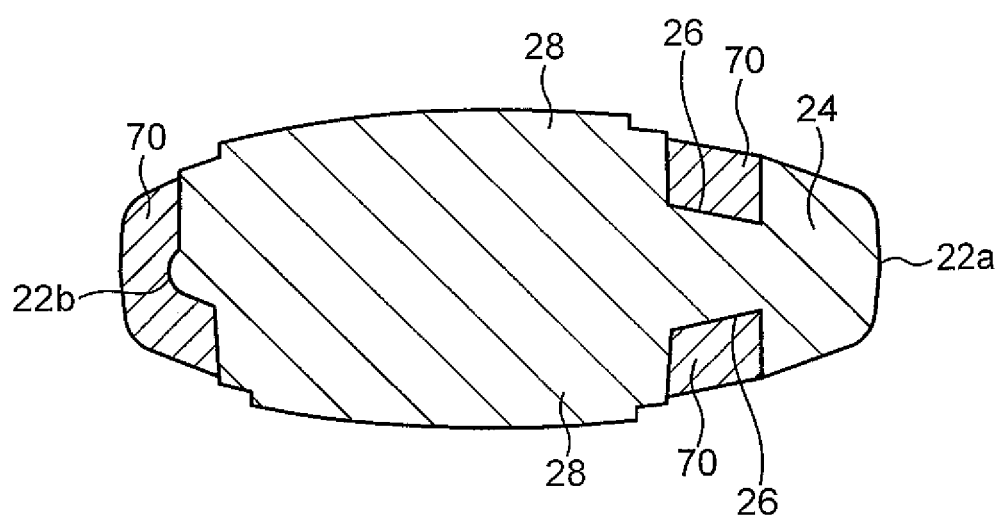
FIG. 7 is a sectional view taken along line VII-VII in FIG. 2.
Figure 8:
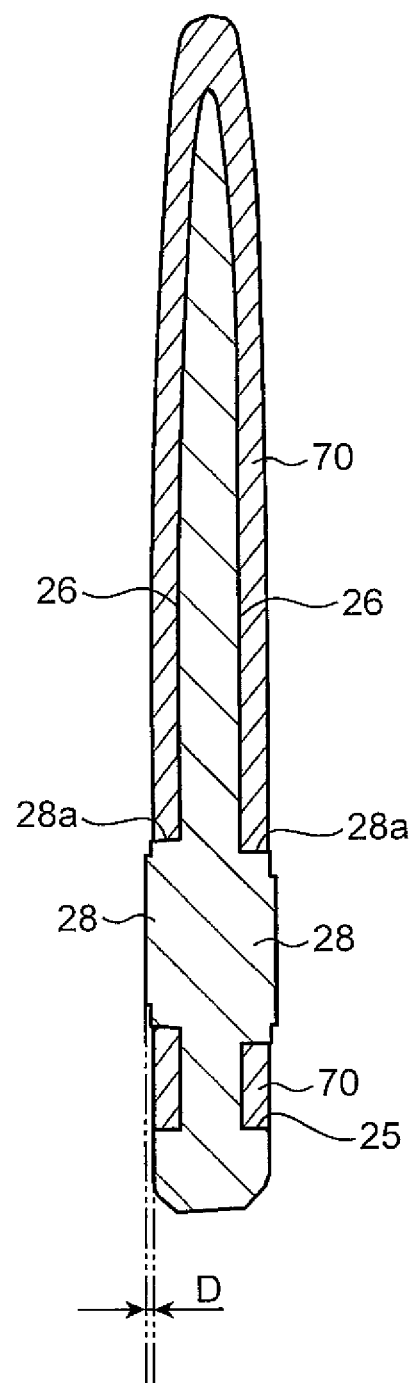
FIG. 8 is a sectional view taken along line VIII-VIII in FIG. 2.

As shown in FIGS. 7 and 8, the recessed portion 26 has a shape recessed from surfaces of the base 24. The recessed portion 26 includes the back-side edge portion 22b and has the curved shape. The recessed portion 26 is formed on both surfaces of the handle main body 22. As shown in FIG. 4, the recessed portion 26 has a flow path widening region 26A. The flow path widening region 26A is a region in which a flow path area for the elastomer at a portion distant by 1 mm from a specific portion of the recessed portion 26 to the opposite side from the shaft portion 40 (downward in FIG. 4) is larger by no less than 7% in comparison with a flow path area for the elastomer at the specific portion. In FIG. 4, the flow path widening region 26A is hatched for the purpose of illustration.

Each of the bulge portions 28 has a shape bulging from a portion of a surface of the recessed portion 26 at a distance from a boundary 25 between the base 24 and the recessed portion 26 (a side surface rising from a proximal end portion of the recessed portion 26). Each of the bulge portions 28 is formed at a position at which the bulge portion 28 at least partially overlaps the flow path widening region 26A of the recessed portion 26. A side surface 28a of each of the bulge portions 28 is formed in a shape which is gradually and slightly inclined toward a center of the bulge portion 28 as a distance from the surface of the recessed portion 26 increases.

The held portion 30 is a part to be held by the second mold 200 in the second step. The held portion 30 is connected to a proximal end portion of the handle main body 22. With regard to the present embodiment, a single hole 30h is formed in the held portion 30. The hole 30h is used by the second mold 200 to hold the held portion 30. Therefore, as compared with a case where a plurality of holes are formed in the held portion 30, strength of the second mold 200 is secured.

The shaft portion 40 is connected to the distal end portion (upper end portion in FIG. 4) of the handle portion 20 and has a shape which allows the shaft portion 40 to be inserted into interdental spaces. The shaft portion 40 has a shape extending straight. The shaft portion 40 has a sectional area (an area of a section along a plane orthogonal to the axial direction of the shaft portion 40) smaller than a sectional area of the handle portion 20. The shaft portion 40 has a substantially circular columnar shape. In detail, the shaft portion 40 is formed into a shape having an outer diameter which gradually and slightly reduces from the proximal end portion toward the distal end portion. The shaft portion 40 is formed integrally with the handle portion 20. An orientation (attitude) of the shaft portion 40 with respect to the handle portion 20 is set so that an angle between a tangent to a distal end portion of the back-side edge portion 22b and the axial direction of the shaft portion 40 is smaller than an angle between a tangent to a distal end portion of the belly-side edge portion 22a and the axial direction of the shaft portion 40.

From a viewpoint of a smooth flow of the elastomer, an angle θ (c.f. FIG. 4) between a first straight line L1 extending through the center of the shaft portion 40 and a second straight line L2 is preferably set to 10° to 50°. The second straight line L2 is a straight line extending through a first midpoint P3 and a second midpoint Q3. The first midpoint P3 is a midpoint between an intersection point P1 of a first circle C1 in a first radius (45 mm in the present embodiment), which is centered at the distal end portion 40a of the shaft portion 40, with the belly-side edge portion 22a and an intersection point P2 of the first circle C1 with the belly-side edge portion 22a. The second midpoint Q3 is a midpoint between an intersection point Q1 of a second circle C2 in a second radius (50 mm in the present embodiment), which is centered at the distal end portion 40a of the shaft portion 40, with the belly-side edge portion 22a and an intersection point Q2 of the second circle C2 with the back-side edge portion 22b.

As shown in FIG. 3, the soft portion 50 includes a cleaning portion 60 configured to clean interdental spaces, a slip resistance portion 70 and a coupling portion 80.

The cleaning portion 60 is provided around the shaft portion 40. The cleaning portion 60 includes a cleaning portion main body 62 having such a shape as to cover a surface of the shaft portion 40 and brush hairs 64. Each of the brush hairs 64 protrudes outward in a direction orthogonal to the axial direction of the shaft portion 40 from the outer peripheral surface of the cleaning portion main body 62 and has an outer shape gradually getting smaller as a distance from the outer peripheral surface of the cleaning portion main body 62 increases. With regard to the present embodiment, each of the brush hairs 64 is formed in a cone shape.

The slip resistance portion 70 is formed on the surface of the recessed portion 26. As shown in FIGS. 7 and 8, a surface of the slip resistance portion 70 is formed to be flush with the surface of the base 24. On the other hand, as shown in FIG. 8, a surface of each of the bulge portions 28 protrudes by a predetermined dimension D (0.15 mm in the present embodiment) from the surface of the slip resistance portion 70 and the surface of the base 24.

The coupling portion 80 couples the cleaning portion 60 and the slip resistance portion 70. In detail, the coupling portion 80 couples the cleaning portion 60 and the slip resistance portion 70 on a surface of the distal end portion of the back-side edge portion 22*b* of the handle main body 22. A sectional area of the coupling portion 80 is smaller than a sectional area of the cleaning portion main body 62 and a sectional area of the slip resistance portion 70.

Figure 5:
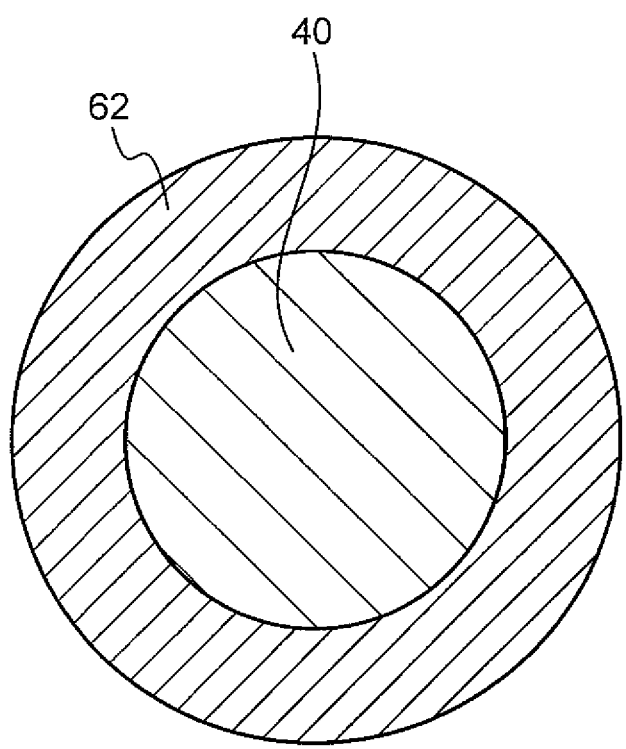
FIG. 5 is a sectional view taken along line V-V in FIG. 2.
Figure 6:
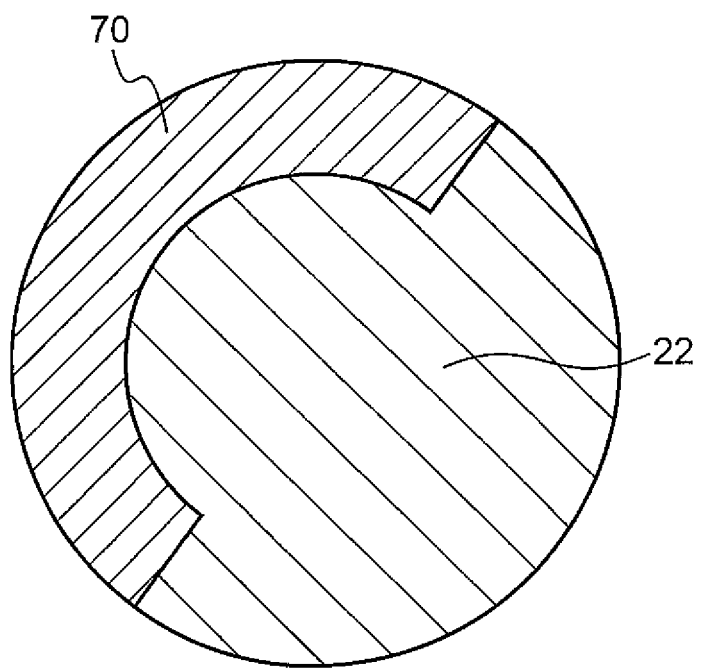
FIG. 6 is a sectional view taken along line VI-VI in FIG. 2.

FIG. 5 shows a section of the cleaning portion 60 at the proximal end portion, and FIG. 6 shows a section of the coupling portion 80 at the distal end portion. As shown in FIGS. 5 and 6, an area of the elastomer at the distal end portion of the coupling portion 80 (hereinafter referred to as "coupling portion distal end portion area") is smaller than an area of the elastomer at the proximal end portion of the cleaning portion 60 (hereinafter referred to as "cleaning portion proximal end portion area"). In detail, a ratio of the coupling portion distal end portion area to the cleaning portion proximal end portion area is preferably between 40% and 90% (inclusive), more preferably between 50% and 85% (inclusive), and yet more preferably between 65% and 85% (inclusive). With regard to the present embodiment, the ratio is set to 70%.

A method for manufacturing the interdental cleaner 2 is described with reference to FIGS. 9 and 10. The manufacturing method includes the first step and the second step as described above.

In the first step, the composite material (material including the synthetic resin, the glass fiber and titanium dioxide) is filled into the first mold 100 having the first space in correspondence to the base portions 10 from gates which is formed at positions in correspondence to the proximal end portions of the base portions 10. In this manner, the base portions 10 are molded. Although not illustrated, the first space is a space having a shape in conformity to the base portions 10 connected to each other by the connecting portions 32.

In the second step, the second mold 200 having the spaces for forming the soft portions 50 on the base portions 10 is used. In this step, the base portions 10 are situated in the second mold 200 at first. In detail, the base portions 10 are situated in the second mold 200 so that holding portions 202 of the second mold 200 are fitted in the holes 30*h* in the held portions 30 and that the bulge portions 28 of the base portions 10 are fitted with inner surfaces of the second mold 200. At this time, since the side surface 28*a* of each of the bulge portions 28 is formed in a shape which is gradually and slightly inclined toward the center of the bulge portion 28 as a distance from the surface of the recessed portion 26 increases, each of the bulge portions 28 is guided so as to be fitted with the inner surface of the second mold 200, even if each of the bulge portions 28 is slightly biased from the position in which the bulge portion 28 is fitted with the inner surface of the second mold 200. Then, the elastomer is filled into the second mold 200 in this state. In detail, the elastomer is injected from gates 204 formed at positions of the second mold 200 in correspondence to the distal end portions of the shaft portions 40. In this way, the elastomer flows from the peripheries of the shaft portions 40 toward the recessed portions 26.

With regard to the present embodiment, a ratio of the coupling portion distal end portion area (the flow path area for the elastomer around the distal end portion of the back-side edge portion 22*b* of each of the handle main bodies 22 in the section at the distal end portion) to the cleaning portion proximal end portion area (the flow path area for the elastomer around the proximal end portion of each of the shaft portions 40 in the section of the proximal end portion) is set to 70%, so that an excessively large pressure loss is suppressed when the elastomer flowing along each of the shaft portions 40 flows through a space in correspondence to each of the coupling portions 80. Therefore, the elastomer flows smoothly from the space around each of the shaft portions 40 toward the space in correspondence to each of the slip resistance portions 70 through the space in correspondence to each of the coupling portions 80. In this way, it is suppressed for the elastomer to leak from the second spaces in the second step. Since the ratio is set to 70%, pressure loss is secured to some extent when the elastomer flows through the space in correspondence to each of the coupling portions 80. In this way, the elastomer is filled into the spaces in correspondence to the respective brush hairs 64, so that it is suppressed that incomplete molding happens to each of the cleaning portions 60.

When the elastomer is further filled along each of the recessed portions 26, the elastomer collides with the side surface 28*a* of each of the bulge portions 28 before colliding with the boundary 25 between the base 24 and the recessed portion 26 (the side surface rising from the proximal end portion of the recessed portion 26). At this time, a flow velocity of the elastomer reduces. Then, the elastomer colliding with the side surface 28*a* of each of the bulge portions 28 flows around the bulge portion 28 and reaches the boundary 25. In this way, the elastomer is prevented from strongly colliding with the boundary 25 between the recessed portion 26 and the base 24. As a result, in the second step, it is suppressed for the elastomer to leak from the second spaces in the second mold 200 to the outside of the second spaces.

Through the aforementioned steps, the interdental cleaner group 1 including the interdental cleaners 2 is formed. For the interdental cleaner group 1, it is possible to check insufficient filling (short shot) of the elastomer near the bulge portions 28 by taking an image of the interdental cleaner group 1. In detail, since each of the bulge portions 28 is formed as a floating structure in the slip resistance portion 70 made of the elastomer, it is possible to check insufficient filling by checking whether the elastomer is filled appropriately to surround each of the bulge portions 28.

With regard to the aforementioned embodiment, since each of the shaft portions 40 and each of the handle main portions 22 are slightly displaced toward each of the belly-side edge portions 22*a* due to an injection pressure of the elastomer while each of the holding portions 202 works as a fulcrum when the elastomer flows along each of the back-side edge portions 22*b* in the second step, the space for forming each of the coupling portions 80 (the flow path area for the elastomer) is secured. As a result, the elastomer smoothly flows toward each of the recessed portions 26.

Since each of the base portions 10 is molded in the first step to have a smaller angle between the tangent to the distal end portion of the back-side edge portion 22*b* and the axial direction of the shaft portion 40 than an angle between the tangent to the distal end portion of the belly-side edge portion 22*a* and the axial direction of the shaft portion 40, the elastomer further smoothly flows from the periphery of each of the shaft portions 40 toward each of the recessed portions 26 in the second step.

Since a part of each of the bulge portions 28 is situated in each of the flow path widening regions 26A, it is possible to manufacture the interdental cleaners 2 having effective slip resistance functions of the slip resistance portions 70 with suppressing jetting near each of the flow path widening regions 26A when the elastomer flows along each of the recessed portions 26 in the second step. In detail, if each of the flow path areas in each of the recessed portions 26 for the elastomer increases abruptly when the elastomer flows along the recessed portion 26, the jetting may occur near the position of the abrupt increase in the flow path area. With regard to this manufacturing method, since each of the bulge portions 28 is at least partially situated in each of the flow path widening regions 26A, the jetting resultant from the increase in the flow path area is suppressed.

Since the composite material filled into the first mold 100 in the first step includes the glass fiber, the base portions 10 reinforced with the glass fiber are molded. As a result, it is possible to suppress damage to the bulge portions 28 even if there is a contact between the bulge portions 28 and the second mold 200 when the base portions 10 are situated in the second mold 200. Vibration of the base portions 10 may be suppressed as well when the base portions 10 are situated in the second mold 200.

The composite material further includes titanium dioxide. Although the reinforcing effect of the glass fiber on the base portions 10 is slightly reduced by the inclusion of titanium dioxide, the bulge portions 28 provided to the base portions 10 suppress the reduction in strength of the handle portions 20 caused by the inclusion of titanium dioxide and the resultant vibration of the base portions 10 in positioning of the base portions 10 in the second mold 200. It is possible to mold the white base portions 10 at low cost. It is preferable from a viewpoint of suppressing the reduction in strength that material used to obtain the white base portions 10 is zinc sulfide.

Since the base 24 extends continuously along the belly-side edge portion 22a, the handle portion 20 has higher strength as compared to a case in which a part of the slip resistance portion 70 made of the elastomer is provided along the belly-side edge portion 22a, for example.

The embodiment disclosed this time is merely an example in every respect and should not be considered restrictive. The scope of the invention is not defined in the aforementioned description of the embodiment but is defined in claims and includes meanings equivalent to the claims and all modifications in the scope of the claims.

For example, injecting positions of the elastomer in the second step, i.e., the positions of the gates 204 are not restricted to those in the aforementioned example. The gates 204 may be provided at positions in correspondence to portions of the base portions 10 between the shaft portions 40 and the bulge portions 28. In this way, the elastomer flowing along each of the recessed portions 26 becomes likely to collide with the side surface 28a of each of the bulge portions 28. As a result, so-called jetting is suppressed near each of the bulge portions 28.

The recessed portion 26 and the slip resistance portion 70 may be provided to only one surface of the handle main body 22.

A mold, which has a lower mold including a base mold and a rotatable mold and an upper mold for forming a first space and a second space with the lower mold, may be used as the first mold 100 and the second mold 200. The rotatable mold is a mold which is rotatable with respect to the base mold while holding the held portion 30 of the base portion 10. The base mold has portions configured to form a space in correspondence to the handle main body 22 and the shaft portion 40, and a space in correspondence to the soft portion 50. The rotatable mold has a portion configured to form a space in correspondence to the held portion 30. In the case of using the lower mold and the upper mold, composite material is filled into the first space formed between the lower mold and the upper mold in the first step. Then, after the first step, the upper mold is separated from the lower mold upward, and the rotatable mold is separated from the base mold upward while holding the held portion 30 and rotates 180° in the position, and then is displaced toward the base mold again. In this way, the base portion 10 is situated in the space in the lower mold, the space being in correspondence to the soft portion 50 (the region below the second space). Then, the upper mold comes into contact with the lower mold to form the first space and the second space. Subsequently, in the second step, elastomer is filled into the second space. In synchronization with the second step, the composite material is filled into the first space (the first step is performed). Through the aforementioned steps, the interdental cleaners are manufactured continuously.

The coupling portions 80 may not be provided. In this case, the second mold 200 is provided with gates for forming the cleaning portions 60 and gates for forming the slip resistance portions 70. The elastomer is injected from the respective gates.

REFERENCE SIGNS 1 interdental cleaner group
2 interdental cleaner
10 base portion
20 handle portion
22 handle main body
22a belly-side edge portion
22b back-side edge portion
24 base
26 recessed portion
28 bulge portion
30 held portion
40 shaft portion
50 soft portion
60 cleaning portion
70 slip resistance portion
80 coupling portion
100 first mold
200 second mold

The invention claimed is:

1. A method for manufacturing an interdental cleaner, the method comprising:
a first step of molding a base portion by filling composite material including synthetic resin into a first mold having a first space in correspondence to the base portion including a handle portion, which has a shape that is at least partially curved, and a shaft portion connected to a distal end portion of the handle portion, the shaft portion having a sectional area smaller than a sectional area of the handle portion, and a shape which allows the shaft portion to be inserted into an interdental space; and
a second step of forming a cleaning portion, which is configured to clean the interdental space, and a slip resistance portion by filling elastomer into a second mold under a condition in which the base portion is situated in the second mold, the second mold including a second space configured to form the cleaning portion around the shaft portion and form the slip resistance portion on a surface of the handle portion,
wherein in the first step, what is molded as the handle portion includes a base, a recessed portion having a shape recessed from a surface of the base, and a bulge portion bulging from a portion of a surface of the recessed portion, which is distant from a boundary between the base and the recessed portion, and wherein in the second step, the cleaning portion around the shaft portion and the slip resistance portion on the surface of the recessed portion are formed by filling the elastomer into the second space from a portion of the base portion which is closer to the shaft portion than the bulge portion so that the elastomer flows along the shaft portion and the recessed portion.

2. The method for manufacturing an interdental cleaner according to claim 1, wherein in the second step, the elastomer is filled into the second space from a position in correspondence to a distal end portion of the shaft portion.

3. The method for manufacturing an interdental cleaner according to claim 2, wherein in the first step, what is molded as the handle portion has a back-side edge portion formed on one side in a direction orthogonal to an axial direction of the shaft portion to have a curved shape, a belly-side edge portion formed on another side to have a curved shape, the base formed at a position including at least a part of the belly-side edge portion, the recessed portion formed at a position including at least a part of the back-side edge portion, and an angle between a tangent to a distal end portion of the back-side edge portion and the axial direction of the shaft portion, the angle being smaller than an angle between a tangent to a distal end portion of the belly-side edge portion and the axial direction of the shaft portion.

4. The method for manufacturing an interdental cleaner according to claim 3, wherein in the first step, what is molded has the recessed portion including a flow path widening region in which a flow path area for the elastomer at a portion distant by 1 mm from a specific portion of the recessed portion to an opposite side from the shaft portion is larger by no less than 7% in comparison with a flow path area for the elastomer at the specific portion, and the bulge portion which is at least partially situated in the flow path widening region.

5. The method for manufacturing an interdental cleaner according to claim 3, wherein in the first step, the composite material including the synthetic resin and glass fiber is filled into the first mold.

6. The method for manufacturing an interdental cleaner according to claim 2, wherein in the first step, what is molded has the recessed portion including a flow path widening region in which a flow path area for the elastomer at a portion distant by 1 mm from a specific portion of the recessed portion to an opposite side from the shaft position is larger by no less than 7% in comparison with a flow path area for the elastomer at the specific portion, and the bulge portion which is at least partially situated in the flow path widening region.

7. The method for manufacturing an interdental cleaner according to claim 6, wherein in the first step, the composite material including the synthetic resin and glass fiber is filled into the first mold.

8. The method for manufacturing an interdental cleaner according to claim 2, wherein in the first step, the composite material including the synthetic resin and glass fiber is filled into the first mold.

9. The method for manufacturing an interdental cleaner according to claim 1, wherein in the first step, the composite material including the synthetic resin and glass fiber is filled into the first mold.

10. The method for manufacturing an interdental cleaner according to claim 9, wherein in the first step, the composite material further including titanium dioxide is filled into the first mold.

11. A method for manufacturing an interdental cleaner, the method comprising:

a first step of molding a base portion b filling composite material including synthetic resin into a first mold having a first space in correspondence to the base portion including a handle portion, which has a shape that is at least partially curved, and a shaft portion connected to a distal end portion of the handle portion, the shaft portion having a sectional area smaller than a sectional area of the handle portion, and a shape which allows the shaft portion to be inserted into an interdental space; and a second step of forming a cleaning portion, which is configured to clean the interdental space, and a slip resistance portion by filling elastomer into a second mold under a condition in which the base portion is situated in the second mold, the second mold including a second space configured to form the cleaning portion around the shaft portion and form the slip resistance portion on a surface of handle portion, wherein in the first step, what is molded as the handle portion includes a base, a recessed portion having a shape recessed from a surface of the base, and a bulge portion bulging from a portion of a surface of the recessed portion, which is distant from a boundary between the base and the recessed portion, and wherein in the second step, the cleaning portion around the shaft portion and the slip resistance portion on the surface of the recessed portion are formed by filling the elastomer into the second space from a portion of the recessed portion which is closer to the shall portion than the bulge portion.

12. The method for manufacturing an interdental cleaner according to claim 11, wherein in the first step, the composite material including the synthetic resin and glass fiber is filled into the first mold.

* * * * *